(12) United States Patent
Ko et al.

(10) Patent No.: US 7,139,566 B2
(45) Date of Patent: Nov. 21, 2006

(54) METHOD FOR INFORMING MOBILE COMMUNICATION TERMINAL OF ENTRANCE INTO SPECIFIC SERVICE NETWORK IN MOBILE COMMUNICATION SYSTEM AND METHOD FOR CHANGING INCOMING CALL INDICATION MODE TO VIBRATION OR SILENT MODE

(75) Inventors: Young-Uk Ko, Suwon-shi (KR); Sung-Chul Hong, Koyang-shi (KR); Sung-Mok Yu, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 232 days.

(21) Appl. No.: 10/646,931

(22) Filed: Aug. 25, 2003

(65) Prior Publication Data

US 2004/0048624 A1   Mar. 11, 2004

(30) Foreign Application Priority Data

Sep. 10, 2002   (KR) ...................... 10-2002-0054637
Mar. 20, 2003   (KR) ...................... 10-2003-0017609

(51) Int. Cl.
*H04Q 7/20* (2006.01)

(52) U.S. Cl. ................. 455/426.1; 455/462; 455/554.1; 455/435.1

(58) Field of Classification Search ............. 455/426.1, 455/462, 554.1, 412.1, 435.1, 412.2, 422.1, 455/423, 432.1, 432.2
See application file for complete search history.

(56) References Cited

U.S. PATENT DOCUMENTS 5,629,710 A   5/1997   Sawada
5,844,522 A   12/1998  Sheffer et al.
5,945,949 A   8/1999   Yun (Continued)

FOREIGN PATENT DOCUMENTS

JP   08-182037   7/1996

(Continued)

OTHER PUBLICATIONS

Japanese Office Action of the Japanese Patent Application No. 2003-318928, mailed on Feb. 7, 2006.

(Continued)

*Primary Examiner*—Joseph Feild
*Assistant Examiner*—Huy D. Nguyen
(74) *Attorney, Agent, or Firm*—Robert E. Bushnell, Esq.

(57) ABSTRACT

Disclosed is a method for informing a mobile communication terminal of an entrance into a specific service network in a mobile communication system and a method for changing an incoming call indication mode to a vibration or silent mode. The method for informing a user of a private mobile communication service possible area when a mobile communication terminal enters a private mobile communication network being interoperable with a public mobile communication network includes the steps of: a) upon receiving a system parameter message being broadcast by the private mobile communication system, checking a predetermined bit for indicating the private mobile communication service area contained in the system parameter message, and determining whether the mobile communication terminal exists in the private mobile communication service area; b) if the mobile communication terminal exists in the private mobile communication service area, transmitting a location registration message having a predetermined registration type to the private mobile communication system; c) receiving a message indicating a private mobile communication service possible state from the private mobile communication system according to registration result information of the private mobile communication system; and d) informing the user of the private mobile communication service possible state.

16 Claims, 6 Drawing Sheets

U.S. PATENT DOCUMENTS

| | | | |
|---|---|---|---|
| 6,108,553 A | 8/2000 | Silventoinen et al. | |
| 6,169,895 B1 * | 1/2001 | Buhrmann et al. | 455/423 |
| 6,259,406 B1 | 7/2001 | Sugiura et al. | |
| 6,308,073 B1 | 10/2001 | Petty et al. | |
| 6,330,442 B1 * | 12/2001 | Seppanen | 455/426.1 |
| 6,405,047 B1 | 6/2002 | Moon | |
| 2001/0046214 A1 * | 11/2001 | Kang | 370/328 |
| 2001/0046859 A1 | 11/2001 | Kil | |
| 2001/0046860 A1 * | 11/2001 | Lee | 455/426 |
| 2002/0022481 A1 * | 2/2002 | Yang | 455/432 |
| 2002/0022497 A1 * | 2/2002 | Kim et al. | 455/554 |
| 2004/0203615 A1 * | 10/2004 | Qu et al. | 455/412.1 |
| 2004/0203763 A1 * | 10/2004 | Tammi | 455/435.1 |

FOREIGN PATENT DOCUMENTS

| | | |
|---|---|---|
| JP | 10-023539 | 1/1998 |
| JP | 10-042362 | 2/1998 |
| JP | 2000-236578 | 8/2000 |
| KR | 2001-0107028 | 12/2001 |
| WO | WO 1996/35309 | 11/1996 |
| WO | WO 1998/02008 | 1/1998 |

OTHER PUBLICATIONS

Australian Patent Examiner's First Report, Serial No. 2003-242432 dated Apr. 14, 2004.

* cited by examiner

METHOD FOR INFORMING MOBILE COMMUNICATION TERMINAL OF ENTRANCE INTO SPECIFIC SERVICE NETWORK IN MOBILE COMMUNICATION SYSTEM AND METHOD FOR CHANGING INCOMING CALL INDICATION MODE TO VIBRATION OR SILENT MODE

CLAIM OF PRIORITY

This application makes reference to, incorporates the same herein, and claims all benefits accruing under 35 U.S.C. §119 from applications for METHOD FOR INFORMING USER WHETHER A MOBILE STATION ENTER PRIVATE MOBILE COMMUNICATION NETWORK IN PUBLIC/PRIVATE MOBILE COMMUNICATION SYSTEM earlier filed in the Korean Intellectual Property Office on 10 Sep. 2002 and there duly assigned Serial No. 2002-54637, and for METHOD FOR INFORMING USER MOVEMENT TO SPECIFIC SERVICE NETWORK IN MOBILE COMMUNICATION SYSTEM AND METHOD FOR MANNER MODE CONVERSION earlier filed in the Korean Intellectual Property Office on 20 Mar. 2003 and there duly assigned Serial No. 2003-17609.

BACKGROUND OF THE INVENTION

1. Field of the Invention

The present invention relates to a mobile communication system, and more particularly to a method for providing a mobile communication terminal with a private mobile communication service when the mobile communication terminal enters a private mobile communication network in a private mobile communication system interoperable with a public mobile communication network.

2. Description of the Related Art

Typically, a mobile communication network is classified into a public mobile communication network and a private (or office) mobile communication network, but it is impossible for the public mobile communication network to be interoperable with the private mobile communication network. That is, a mobile communication system is designed and implemented to enable only a public mobile communication service or only a private mobile communication service, so that a subscriber of a mobile communication terminal registered in a network can receive a communication service over a specific network with which the subscriber is registered.

Therefore, a subscriber of a mobile communication terminal registered in the public mobile communication network cannot receive a private mobile communication service, and a subscriber of a mobile communication terminal registered in a private mobile communication network cannot receive a public mobile communication service. As a result, it is necessary for a subscriber of a mobile communication terminal to receive a public mobile communication service and a private mobile communication service at the same time, using a single mobile communication terminal. In case of implementing a system for providing public and private mobile communication services at the same time, it is necessary for the system to determine whether a called party's call is a call generated from a public mobile communication network or a call generated from a private mobile communication network in case of a call termination.

Therefore, many developers are intensively conducting research into a new communication service method for enabling a subscriber of a mobile communication terminal registered in a public mobile communication network to receive a private mobile communication service along with a public mobile communication service. A representative example has been disclosed in Korean Patent Application No. 2000-028172, filed on 24 May 2000, by the same applicant as the present invention, and entitled "System for enabling Wireless Private Network Service by registering Public Network Mobile Communication Terminal in Office Wireless Private Network", which is hereby incorporated by reference.

However, in the case where a mobile communication terminal registered in both a public mobile communication network and a private mobile communication network enters a zone of the private mobile communication network while using the public mobile communication network, it is difficult for a user of a mobile communication terminal to recognize the entrance into the zone of the private mobile communication network before recognizing whether he or she is in a public land mobile network area or in a private mobile communication network area.

SUMMARY OF THE INVENTION

Therefore, the present invention has been made in view of the above and other problems, and it is an object of the present invention to provide a method for informing a user of a mobile communication terminal of entrance into a private mobile communication network in the case where the user of the mobile communication terminal moves from a public mobile communication network to the private mobile communication network in a system for providing public and private mobile communication services at the same time.

It is another object of the present invention to provide a method for providing a mobile communication terminal with a private mobile communication service in the case where the mobile communication terminal moves from a public mobile communication network to a private mobile communication network in a private mobile communication system interoperable with the public mobile communication network.

It is yet another object of the present invention to provide a method for changing an incoming call indication mode to a vibration or silent mode in a private mobile communication system in the case where a mobile communication terminal moves from a public mobile communication network to a private mobile communication network.

In accordance with the present invention, the above and other objects can be accomplished by the provision of a method for informing a user of a private mobile communication service possible area when a mobile communication terminal enters a private mobile communication network being interoperable with a public mobile communication network, including the steps of: a) upon receiving a system parameter message being broadcast by the private mobile communication system, checking a predetermined bit for indicating the private mobile communication service area contained in the system parameter message; b) if the mobile communication terminal exists in the private mobile communication service area, transmitting a location registration message having a predetermined registration type to the private mobile communication system; c) receiving a message indicating a private mobile communication service possible state from the private mobile communication system according to registration result information of the private mobile communication system; and d) informing the user of the private mobile communication service possible state.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
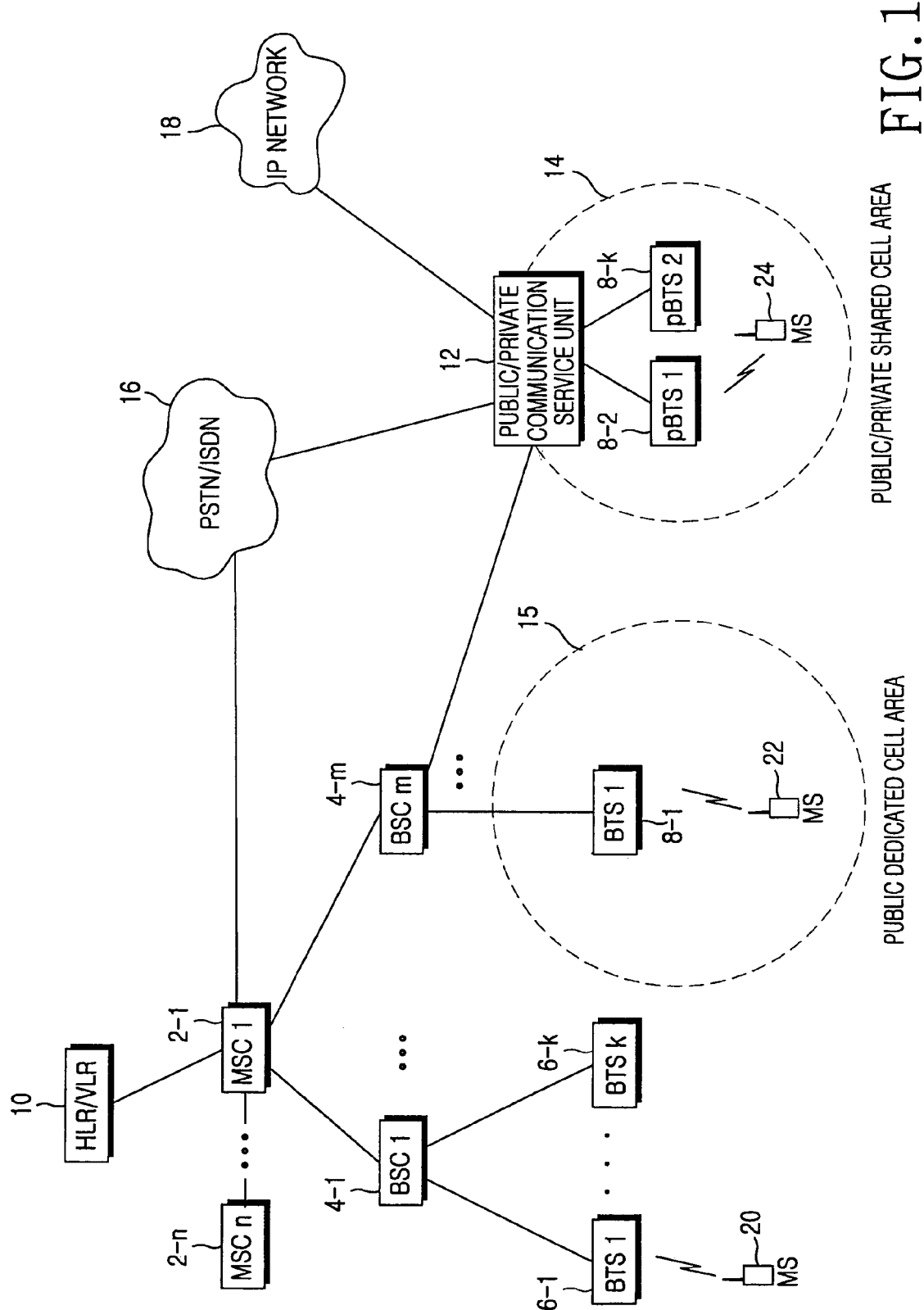
FIG. 1 is a view illustrating a network configuration for explaining a concept of public and private mobile communication services in accordance with a preferred embodiment of the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

It should be noted that a private network system of a limited area such as a specific zone or building provides a pre-registered mobile communication terminal with a wireless private network service. In other words, the wireless private network service is transferred to only the pre-registered mobile communication terminals differently from a public network service.

FIG. 1 is a view illustrating a network configuration for explaining a concept of public and private mobile communication services in accordance with a preferred embodiment of the present invention. Referring to FIG. 1, a public/private (public and private) shared cell area 14 being a shared communication service area between a public mobile communication service and a private mobile communication service is provided to establish public and private mobile communication services at the same time. Also, a public/private communication service unit 12 is shown in FIG. 1. It is desirable that the public/private cell shared cell area 14 should provide a specific group with a convenient communication service. For example, provided that a specific company uses a single building, an area containing the building can be determined as a public/private shared cell area 14. It is desirable that the operation for determining the public/private shared cell area 14 is discussed with a public mobile communication service provider in advance. The reason why the operation for determining the public/private shared cell area 14 is discussed with the public mobile communication service provider is to enable a private base station transceiver subsystem (i.e., a private BTS: 8-k) in the public/private shared cell area 14 to be recognized like a public BTS from the viewpoint of a public mobile communication system. In a preferred embodiment of the present invention, the private BTS (8-k) is called a 'pBTS (private BTS)' to discriminate among a plurality of BTSs, i.e., BTSs 6-1, . . . 6-k, 8-1 shown in FIG. 1, and a private BTS (8-k) of the public/private shared cell area 14. The pBTS(8-k) performs a function for constructing a wireless communication path in association with a mobile station (MS) 24 residing in a public/private shared cell area 14 and a function for managing wireless resources in association with the mobile station (MS) 24. The pBTS(8-k) is connected to a BSC (Base Station Controller) of a public mobile communication system via a public/private communication service unit 12. Namely, the pBTS(8-k) is connected to a BSC(4-m) via the public/private communication service unit 12. The public/private communication service unit 12 is connected to a BSC(4-m) of a public mobile communication system, a PSTN/ISDN (public switching telephone network/integrated services digital network) 16, and an IP (Internet Protocol) network 18. The public/private communication service unit 12 performs a mobile communication service to enable a public mobile communication service or a private mobile communication service to be selectively provided to a plurality of MSs (e.g. a MS 24) residing in the public/private shared cell area 14. In the case where the MS 24 is registered in the public/private communication service unit 12 to receive a private mobile communication service, it can receive a private mobile communication service as well as a public mobile communication service. But, in the case where a private mobile communication service registration of the MS 24 is not recorded in the public/private communication service unit 12, the MS 24 can receive only a public mobile communication service. Also, the public/private communication service unit 12 performs a wired communication service with the PSTN/ISDN 16 and the IP network 18.

In the meantime, the public mobile communication network is typically called a PLMN (Public Land Mobile Network). A public mobile communication system for the PLMN includes a plurality of MSCs (Mobile Switching Centers) 2-1, . . . , 2-n, a plurality of BSCs (Base Station Controllers) 4-1, . . . , 4-m, a plurality of BTSs (Base station Transceiver Subsystem) 6-1, . . . , 6-k, 8-1, . . . , 8-k, a plurality of mobile stations MSs 20 and 22, and a HLR/VLR (Home Location Register/Visitor Location Register) 10. The plurality of BSCs 4-1, . . . , 4-m are connected to each of the MSCs 2-1, . . . , 2-n. The plurality of BTSs 6-1, . . . , 6-k, 8-1, . . . , 8-k are connected to each of the BSCs 4-1, . . . , 4-m. In particular, the pBTS(8-k) functions as one of the BTSs 8-1, . . . , 8-k connected to the BSC(4-m) of a public mobile communication system in accordance with a preferred embodiment of the present invention. Each of the MSCs 2-1, ..., 2-n enables a plurality of BSCs (for example, 4-1, ..., 4-m) connected to the MSCs 2-1, ..., 2-n to be themselves connected with other MSCs residing in either a PSTN/ISDN or a public mobile communication network. Each of the MSCs 4-1, ..., 4-m performs a wireless link control function and a hand-off function. The BTSs 6-1, ..., 6-k, 8-1, ..., 8-k configure a wireless communication path together with MSs 20, 22 and 24 residing in their own communication service areas, i.e., their own cell areas, and perform a function for managing wireless resources. A HLR in the HLR/VLR 10 performs a subscriber location registration function and a database function for storing subscriber information, and a VLR in the HLR/VLR 10 is a database for temporarily storing information of a MS present in a cell area managed by a corresponding MSC among the MSCs 2-1, ..., 2-n. If the MS moves to a cell area managed by another MSC, information stored in the VLR is deleted. In the preferred embodiment of the present invention, in order to discriminate between the public/private shared cell area 14 and communication service areas of the BTSs (6-1, ..., 6-k, 8-1, ... ) of a public mobile communication system, each communication service area of the BTSs (6-1, ..., 6-k, 8-1, ... ) is called a public dedicated cell area. A communication service area of the BTS(8-1) among the BTSs (6-1, ..., 6-k, 8-1, ... ) of the public mobile communication system is indicated as a public dedicated cell area 15. The public dedicated cell area 15 is generally wider than the public/private shared cell area 14 predefined to provide a specific group with a convenient communication service.

Figure 2:
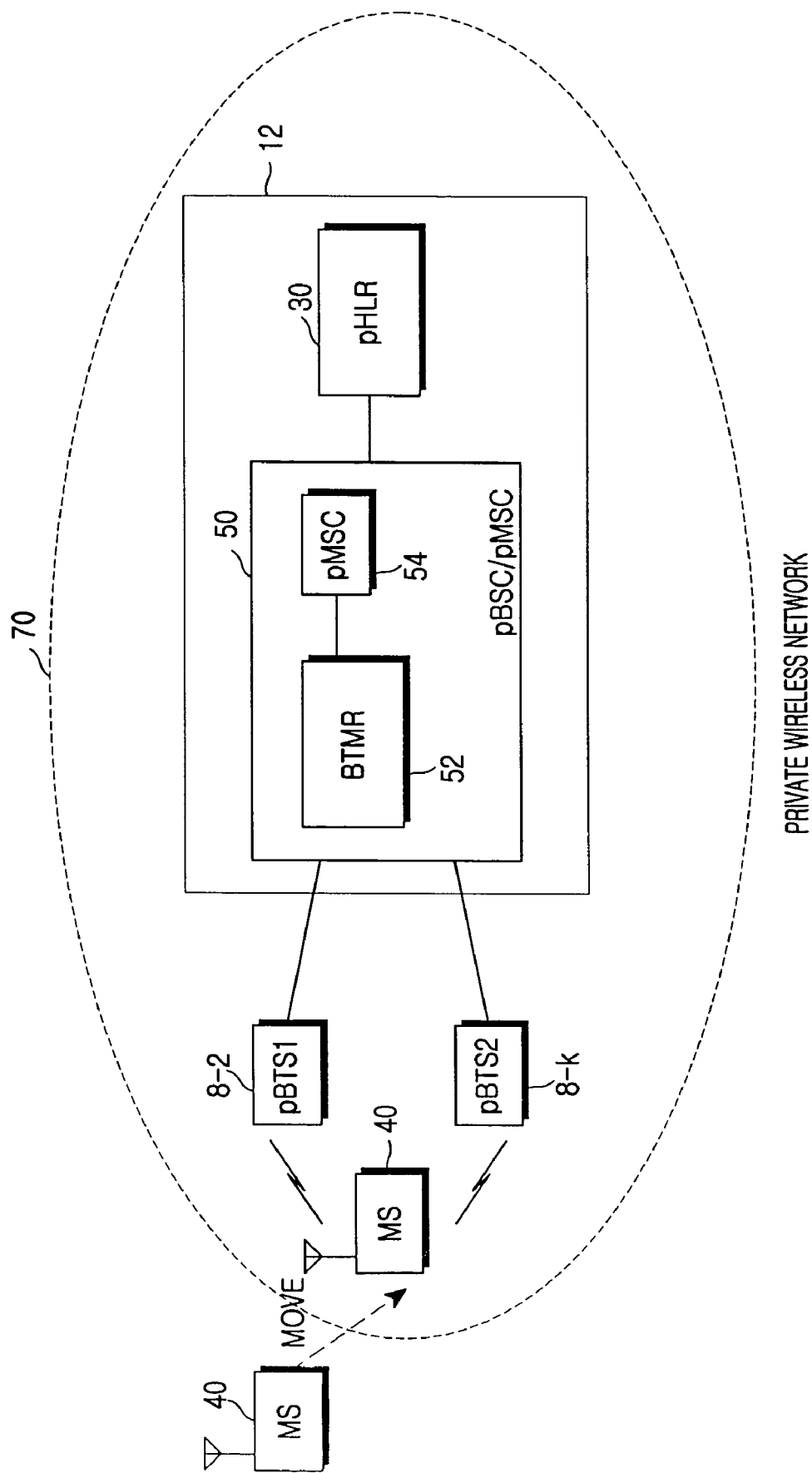
FIG. 2 is a view illustrating a detailed block diagram of a public/private communication service unit 12 and a pBTS (8-k) of a private mobile communication system in accordance with a preferred embodiment of the present invention.

FIG. 2 is a view illustrating a detailed block diagram of a public/private communication service unit 12 and a pBTS (8-k) of a private mobile communication system in accordance with a preferred embodiment of the present invention.

Referring to FIG. 2, a private mobile communication system provides a subscriber of a mobile station (MS) 40 of a limited area (e.g., a zone or a building) with a wireless private network service. The private mobile communication system includes two pBTSs 8-2 and 8-k, a public/private communication service unit 12 for performing functions of a private base station controller (pBSC) and a private mobile switching center (pMSC) of a public mobile communication system, and a private home location register (PHLR) 30. The pBSC/pMSC 50 includes a BTMR (BTS Message Router) 52 and a pMSC 54. The BTMR 52 performs functions corresponding to a BSC of a public mobile communication system. Namely, the BTMR 52 performs a wireless link control function and a handoff function, etc. In more detail, the BTMR 52 is a module for performing a path designation of all messages to be treated in the pBTSs 8-2 and 8-k, designates a control (i.e., a signal) message path for public and private call origination/termination services of a MS 40 with reference to an internal router table, and designates a message path for a maintenance service of the pBTSs 8-2 and 8-k. Also, the BTMR 52 communicates with the pHLR 30. The pMSC 54 performs a function corresponding to a role of a MSC of a prior public mobile communication network in case of supporting a public mobile communication network service and a private mobile communication network service. In more detail, the pMSC 54 analyzes a service request of a subscriber, and defines a basic strategy for determining whether the service request is treated using a prior public mobile communication network service or is treated using a private mobile communication network service, and a control procedure related to the basic strategy. The pMSC 54 cannot perform a switching function by itself differently from the public MSC. The pMSC 54 is a software block so that it has no switching unit such as a public MSC. Accordingly, in case of providing a private mobile communication service, a public/private communication service unit 12 according to the present invention uses a switch of a private exchange system (not shown). The pHLR 30 is a module for managing subscriber information registered in a private mobile communication service, location registration information of a private mobile communication subscriber, and information for a variety of function services. A database for storing various kinds of information is connected to the pHLR 30. The MS 40 needs to be previously registered in a private mobile communication service system in order to receive a corresponding private network service.

With reference to FIG. 2, the pBSC/pMSC 50 of a private mobile communication system according to the present invention informs a mobile communication terminal (MS) 40 positioned in a corresponding private service area of a provision of a private mobile communication service by means of a paging channel message. In more detail, the private mobile communication system selects a prescribed bit from among system parameter messages (MSGs) serving as one of a variety of paging channel messages, and broadcasts the selected bit. In this case, the private mobile communication system is able to set a reserved bit being unused in the system parameter message in order to indicate that the MS 40 exists in a specific network area. Namely, the private mobile communication system indicates a private network area using empty bits of the system parameter message, and broadcasts the system parameter message. In this case, the empty bits of the system parameter message are not defined in communication standards.

A detailed format of the system parameter message is shown in the following Table 1.

TABLE 1

| System Parameter Message: IS-2000 (F-CSCH) |
|---|
| pilot_pn: 356 |
| config_msg_seq: 7 |
| sid: 2189 |
| nid: 65 |
| reg_zone: 1 |
| total_zones: 3 |
| zone timer 0 -> 1 minute |
| mult_sids: 1 |
| mult_nids: 1 |
| base_id: 449 |
| base_class 0 |
| # of paging chan: 1 |
| max_slot_cycle_index: 1 |
| home_reg: 1 |
| for_sid_reg: 1 |
| for_nid_reg: 1 |
| power_up_reg: 1 |
| power_down_reg: 1 |
| parameter_reg: 1 |
| reg_prd: 68 |
| base_lat: 536505 |
| base_long: 1829561 |
| reg_dist: 0 |
| srch_win_a: 7 |
| srch_win_n: 8 |
| srch_win_r: 0 |
| nghbr_max_age: 1 |
| pwr_rep_thresh: 2 |
| pwr_rep_frames: 7 |
| pwr_thresh_enable: 1 |
| pwr_period_enable: 0 |
| pwr_rep_delay: 5 |
| rescan: 0 |
| t_add: 26 |
| t_drop: 30 |

TABLE 1-continued

System Parameter Message: IS-2000 (F-CSCH)

t_comp: 3
t_tdrop: 4
ext_sys_parameter: 1
ext_nghbr_list: 1
gen_nghbr_list: 0
global_redirect: 0
pri_nghbr_list: 0
user_zone_id: 0
ext_global_redirect: 0
ext_chan_list: 0

With reference to the above Table 1, the private mobile communication system sets a third bit value of a parameter "base_id" contained in the aforementioned system parameter messages to "1", and broadcasts this system parameter message. If the MS 40 enters a private network service possible area, then it receives the system parameter message being broadcast in a mobile communication system. The MS 40 searches for a settable bit used for indicating its own presence in a specific network from among the received system parameter messages, such that it is determined that the MS 40 exists in a private network when the settable bit is found.

As described above, the system parameter messages contain such a settable bit used for indicating the presence of the MS 40 in a specific network service possible area. It will be apparent to those skilled in the art that this settable bit is not limited to only the third bit of the parameter "base_id" and will be set to any empty bit contained in the system parameter messages.

On the other hand, if the MS 40 exists in the private network service possible area, then it transmits a registration message to the pBTS1 8-2 and the pBTS2 8-k of a wireless private network over an access channel. In more detail, the MS 40 indicates a current registration type in a field "location registration type" contained in the registration message, and transmits the field "location registration type" having the current registration type to the pBTS1 8-2 and the pBTS2 8-k. The following Table 2 designates this field "location registration type" of the registration message according to the present invention.

TABLE 2

| Registration Type | Element identifier |
|---|---|
| LR_TIME_BASE | 0 |
| LR_POWER_ON | 1 |
| LR_ZONE_BASE | 2 |
| LR_POWER_OFF | 3 |
| LR_PARA_CHANCE | 4 |
| LR_DISTANCE | 6 |
| LR_N_ZONE | 13 |

The registration message includes six registration types according to the 3G-IOS (3-Generation Inter-Operability Specification). The registration message has a registration type called "N_ZONE" according to the present invention. The registration type "N_ZONE" indicates that the MS 40 exists in a private mobile communication network and needs to be registered therein.

In more detail, if the MS 40 receives a system parameter message from the private mobile communication system, then it can recognize its own presence in the private mobile communication Is network. If the MS 40 recognizes its own entrance into the private mobile communication network, then it transmits a registration message having the registration type "N_ZONE" to the private mobile communication system. In more detail, if the MS 40 exists in a private mobile communication service area, then it transmits a registration message having the registration type "N_ZONE" to the private mobile communication system in order to request a private mobile communication service of the private mobile communication system. The registration type "N_ZONE" employs an element identifier unused by a registration type proposed by the communication standards. It will be apparent to those skilled in the art that this element identifier can be freely set in all the applicable communication networks of the present invention.

In the meantime, if the MS 40 receives a system parameter message from a private mobile communication system, then it searches for a settable bit used for indicating its own presence in a specific network from among the received system parameter messages, such that it is determined that the MS 40 exists in a private network when the bit is found. Therefore, the MS 40 stores a prescribed program having a control flow in order to transmit a registration message having the registration type "N_ZONE". It will be apparent to those skilled in the art that the prescribed program having such a control flow can be readily and through software implemented in the MS 40.

Referring again to FIG. 2, if the pBSC/pMSC 50 of the private mobile communication system receives the registration message from the MS 40, then it determines whether the MS 40 can receive a private network service. Namely, the private mobile communication system determines whether the MS 40 transmitting the registration message is previously registered in its own system. In brief, in order to allow the MS 40 to receive a prescribed private network service, the MS 40 should be previously registered in a private mobile communication system for the prescribed private network service.

Provided that the MS 40 is registered in such a private mobile communication system, the private mobile communication system can provide the MS 40 with a command or information indicative of a service possible or impossible state via a paging channel message. In accordance with the present invention, the private mobile communication system sets up a prescribed field of a FNM (Feature Notification Message) shown in the following Table 3 in order to indicate a private network service possible state of a corresponding MS.

TABLE 3

| Information Element | Element Direction | Type | |
|---|---|---|---|
| Message Type | MSC→BS | M | |
| Mobile Identity (TMSI/ Tag | MSC→BS | M$^a$ | |
| Cell Identifier List | MSC→BS | O$^b$ | C |
| Slot Cycle Index | MSC→BS | O$^c$ | C |
| Signal | MSC→BS | O$^d$ | C |
| Message Waiting Indication | MSC→BS | O$^{e,d}$ | C |
| Calling Party ASCII Number | MSC→BS | O$^d$ | C |
| IS-95 Information Records | MSC→BS | O$^f$ | C |

The FNM is a message for allowing a mobile communication system to provide the MS 40 with authentication and authentication service information. The private mobile communication system indicates that the MS 40 exists in a wireless private network service possible area using a field "CHARi" of the IS-95 (Telecommunications Industry Association/Electronic Industries Association (TIA/EIA) Interim Standard (IS) 95 series) Information Records Element of the FNM. Therefore, the MS 40 can inform a user of the presence of his or her MS in the wireless private network service possible area. The following Table 4 designates the IS-95 Information Records Element field of the FNM.

TABLE 4

| IS-95 Information Records | |
|---|---|
| IS_95 Information Records: Al Element Identifier | 0x15 |
| IS_95 Information Records Length | 0x03 |
| Information Record Type | 0x01 |
| Information Record Length | 0x01 |
| Information Record Contents (CHARi) | 0xFF |

With reference to the above Table 5, the private mobile communication system sets the CHARi field of the IS-95 Information Records Elements of the FNM to "0xFF", and transmits the CHARi field with the "0xFF" to the MS 40. The CHARi field is a reserved field defined in communication standards in order to transmit prescribed information from the pBSC/pMSC 50 to the MS 40. The private mobile communication system informs the MS 40 of a wireless private network service possible state using the reserved field.

Therefore, in the case where the MS 40 checks the Information Record Contents (CHARi) field of the received FNM and determines that the CHARi field is set to "0xFF", it is determined that the MS 40 exists in a wireless private network service possible area and this determination message is then transmitted to a user of the MS 40. This method for allowing the MS 40 to inform a user of a wireless private network service possible area can be freely set to one of a variety of indication methods, for example, an icon display, a voice message, and a character display.

In the meantime, a private mobile communication system according to another preferred embodiment of the present invention provides a predetermined field of the FNM with a vibration mode conversion command, such that the MS automatically changes its own incoming call indication mode to the vibration mode when the mobile communication terminal enters a private mobile communication network area. Also, the private mobile communication system enables the MS to receive a private dedicated wireless service through a predetermined field of the FNM.

In more detail, as described above, the pBSC/pMSC 50 sets a specific bit in the system parameter message being broadcast to the private mobile communication network area 70. The MS 40 receiving a system parameter message recognizes its own presence in the range of a private network service area, and then transmits a registration message to the private mobile communication system. Then, the private network mobile communication system transmits an authentication confirmation message and its associated service information to the MS 40. In this case, a vibration or silent mode conversion command is added to the message transmitted to the MS 40. This vibration or silent mode conversion command (hereinafter referred to as a manner mode conversion command) can be set to a predefined value contained in the IS-95 Information Records field of the FNM.

Therefore, upon receiving the manner mode conversion command from the private mobile communication system, the MS 40 converts an incoming call indication mode into a manner mode such as a vibration or silent mode. In this case, if a predefined value is set up in the IS-95 Information Records field of the FNM, then the MS 40 automatically converts the incoming call indication mode into the manner mode.

In this case, it will be apparent to those skilled in the art that the MS 40 stores a prescribed program for searching for a settable bit from among the FNM received from the private mobile communication system in order to convert the incoming call indication mode into the manner mode such as a vibration or silent mode, and converting the incoming call indication mode into the manner mode according to this bit search result.

On the other hand, although the FNM is adapted to indicate a wireless private network service possible area, predetermined information or function using the Information Record Contents (CHARi) field of the IS-95 Information Records Element, the present invention is not limited to only this description, but any other field of the FNM can be freely defined or used according to a communication network applied to the present invention.

Figure 3:
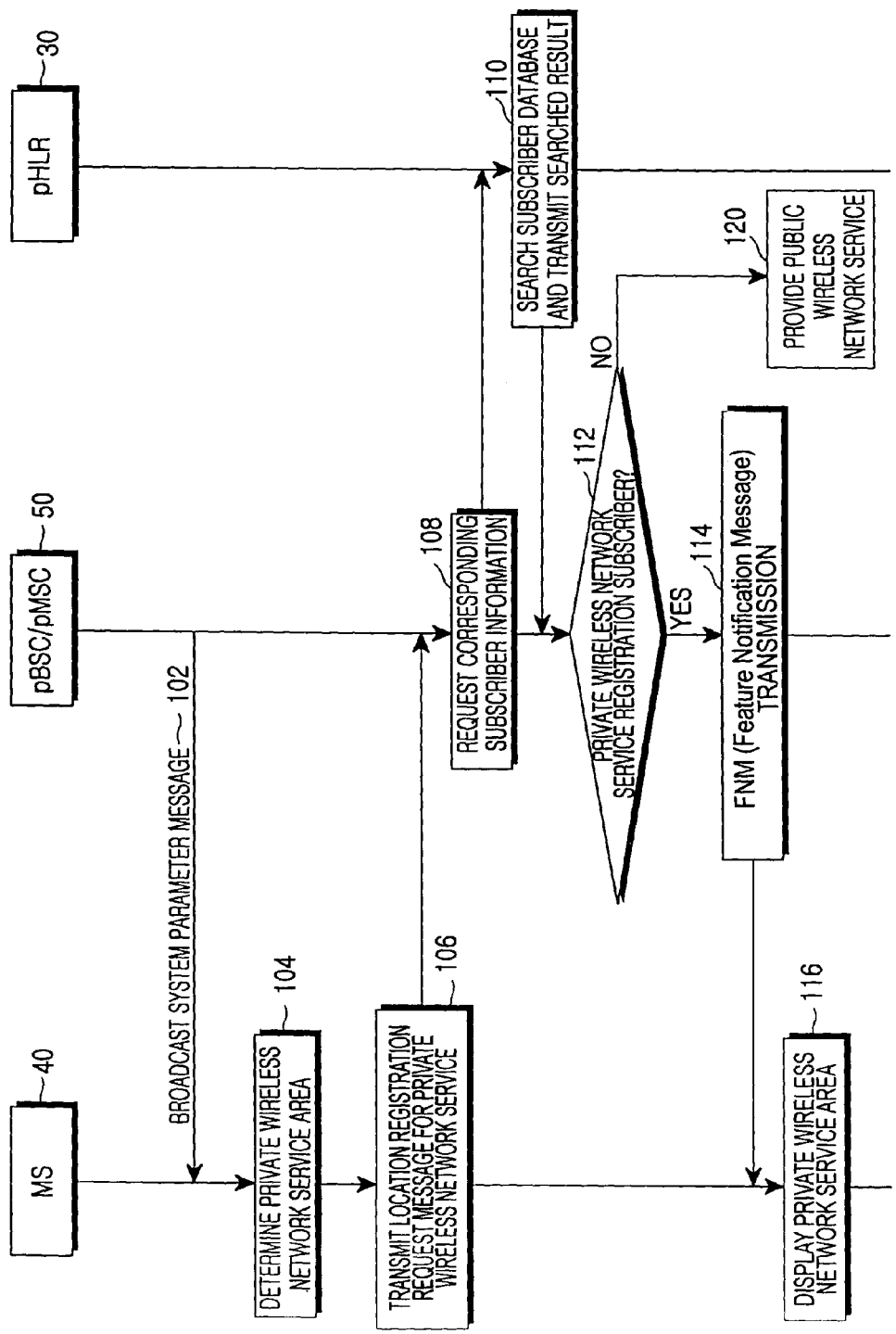
FIG. 3 is a flow chart illustrating a method for informing a mobile communication terminal of a fact that the mobile communication terminal enters a private mobile communication network from a public mobile communication network in a system for providing public and private mobile communication services at the same time in accordance with a preferred embodiment of the present invention.

FIG. 3 is a flow chart illustrating a method for informing a mobile communication terminal of a fact that the mobile communication terminal enters a private mobile communication network from a public mobile communication network in a system for providing public and private mobile communication services at the same time in accordance with a preferred embodiment of the present invention.

Referring to FIGS. 2 and 3, a pBSC/pMSC 50 of a private mobile communication system sets a specific bit in a system parameter message being one of paging channel messages, and broadcasts the specific bit at step 102. That is, a private mobile communication system sets a reserved bit unused in the system parameter message, and broadcasts the reserved bit to a private network. If the mobile communication terminal (MS) 40 receives a system parameter message, then it searches a bit for indicating an entrance into a private network in the system parameter message. In this case, if a corresponding bit is set up, then it is determined that service zones of the pBTS1 8-2 and the pBTS2 8-k of a private mobile communication network are provided at step 104. Subsequently, the mobile communication terminal (MS) 40 transmits a location registration message to the pBTSs 8-2 and 8-k at step 106. A current location registration type is indicated in a field Regi_type among a plurality of fields predefined in a prior location registration message. In accordance with the present invention, a mobile communication terminal (MS) 40 adds a newly defined location registration type to the prior location registration message, and transmits the added message to the pBTSs.

Herein, the reason why the MS 40 uploads terminal information using an access channel is to perform a subscriber authentication in case of a plurality of private mobile communication network areas. For instance, in the case where a private wireless network service is provided in different areas, a subscriber of a first area A cannot receive a private wireless network service in a second area B.

If the pBSC/pMSC 50 of a private mobile communication system receives a location registration request message from the MS 40, then it requests information of a corresponding subscriber from the pHLR 30 at step 108. The pHLR 30 searches a subscriber database, and transmits the searched result to the pBSC/pMSC 50 at step 110. The pBSC/PMSC 50 determines whether the corresponding subscriber is a subscriber registered in a private mobile communication network at step 112. If it is determined at step 112 that the corresponding subscriber is the subscriber registered in the private mobile communication network, the pBSC/pMSC 50 sets a predetermined field of a FNM (Feature Notification Message) and transmits the predetermined field to the MS 40 at step 114. If it is determined at step 112 that a corresponding subscriber is not a subscriber registered in a private mobile communication network, the pBSC/pMSC 50 provides a general public wireless network service at step 120. In the meantime, the MS 40 receiving the FNM searches for a predetermined field within the FNM. If it is determined that a corresponding private mobile communication network service is possible, this private mobile communication network service possible state is informed a user of the MS 40 at step 116. In this case, this method for informing the user of the private mobile communication network service possible state can be freely set to one of a variety of indication methods, for example, an icon display, a voice message, and a character display, etc.

In more detail, the private mobile communication system informs the MS of a private wireless network service possible area using a predetermined field of the FNM, the MS can inform the user of his or her presence in the range of the wireless private network service possible area using a variety of indication methods, for example, an icon display, a voice message, and a character display, etc.

In accordance with another preferred embodiment of the present invention, other information or other function may be defined and used using a predetermined field of the FNM. A private mobile communication system according to the present invention can easily provide an authenticated MS with various services provided from the wireless private network. For example, the private mobile communication system provides a predetermined field of the FNM with a vibration mode conversion command such that a current mode of the MS is automatically changed to a vibration mode when the MS enters the private mobile communication network. In addition, the private mobile communication system may allow the MS to access the private dedicated wireless network through a predetermined field of the FNM.

Figure 4:
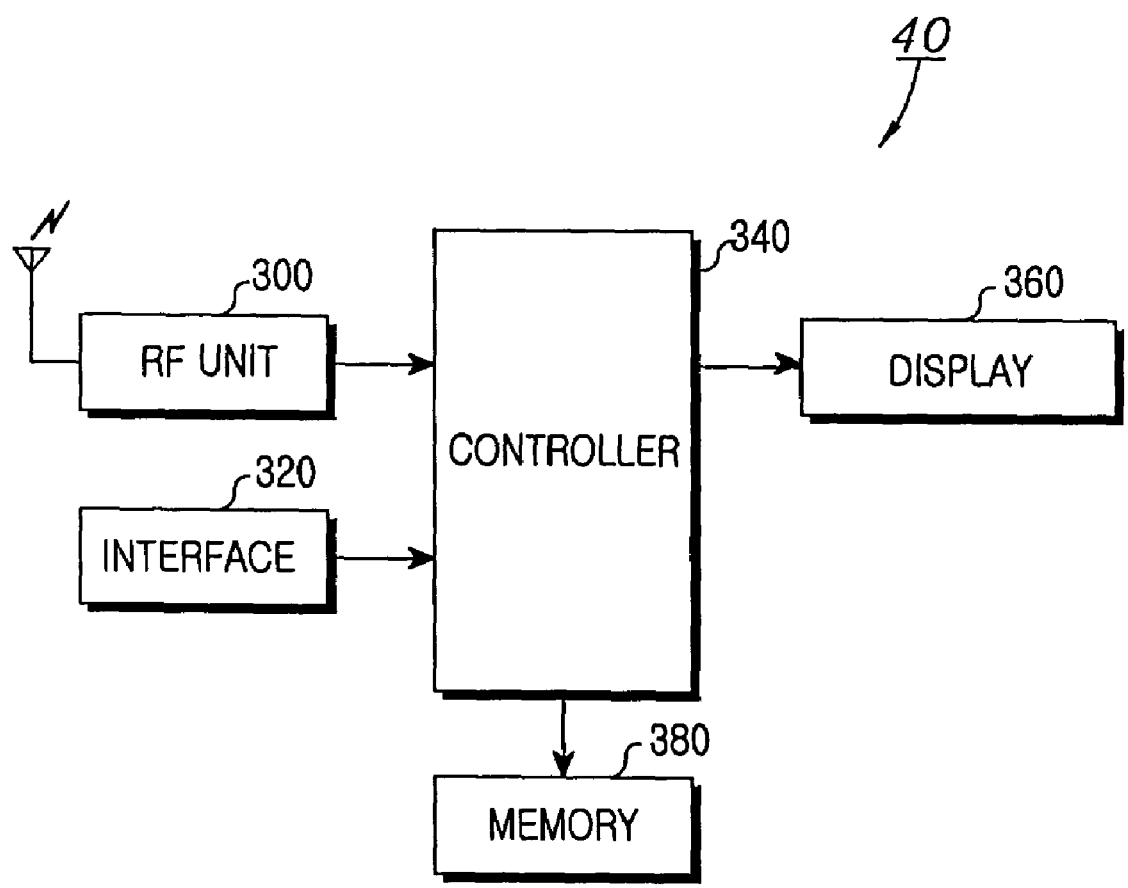
FIG. 4 is a view illustrating a block diagram of a mobile communication terminal in accordance with a preferred embodiment of the present invention.

FIG. 4 is a view illustrating a block diagram of a mobile communication terminal in accordance with a preferred embodiment of the present invention.

Referring to FIG. 4, a controller 340 controls an overall operation of the MS. Upon receiving a system parameter message being broadcast from the private mobile communication system, the controller 340 transmits a location registration message for the wireless private network service to the private mobile communication system. Upon receiving the FNM from the private mobile communication system, the controller 340 searches for a predetermined field from among the FNM in order to determine whether the MS exists in a wireless private network service possible area. If the controller 340 of the MS determines that the MS exists in a wireless private network service possible area, this determination result is transferred to a user of the MS. The user of the MS 40 can freely select his or her desired one from among various indication methods (e.g., an icon display, a voice message, and a character display, etc.) for indicating a wireless private network service possible area. The controller 340 of the MS 40 informs the user of a wireless private network service possible area according to prescribed methods.

In accordance with another preferred embodiment of the present invention, upon receiving the FNM from the private mobile communication system, the controller 340 of the MS searches for all settable bits to perform a predetermined command in the FNM, and performs operations related to each bit setup value.

A RF (radio frequency) unit 300 controls a transmission/reception operation of audio data, character data, and control data upon receiving a control signal from the control unit 340. An interface unit 320 includes a plurality of number keys and function keys, and outputs key input data corresponding to any key selected by a user to the controller 340. Each number key and function key is implemented with a soft key. A display 360 displays a variety of messages on for example an LCD (Liquid Crystal Display) according to a control signal of the controller 340. The display 360 informs a user of a wireless private network service possible area upon receiving a control signal from the controller 340. Herein, information message transmitted to the user can be displayed in the form of an icon or character for example.

A memory 380 includes a program memory for storing program data needed to control an operation of the MS and a data memory for storing data created by either a user or control process of the MS. In the meantime, the MS 40 may audibly inform the user of a wireless private network service possible area using a voice processor or a speaker.

On the other hand, in accordance with another preferred embodiment of the present invention, the MS may further contain a vibrator. Therefore, if the MS enters a wireless private network service area, an incoming call indication mode of the MS is switched to a vibration mode upon receiving a message from a private mobile communication system.

Figure 5:
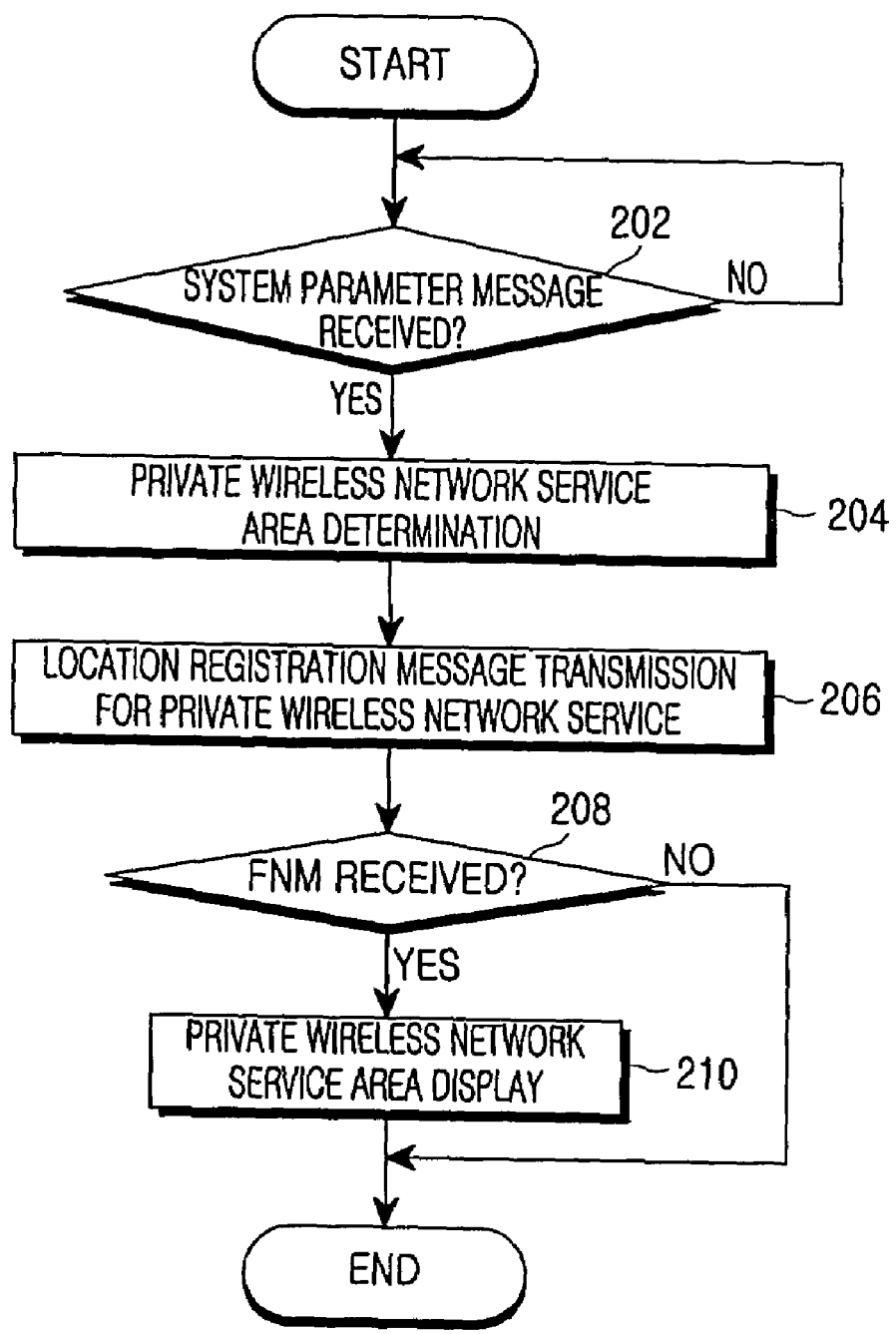
FIG. 5 is a flow chart illustrating a control procedure in the case where a mobile communication terminal enters a private mobile communication network in accordance with a preferred embodiment of the present invention.

FIG. 5 is a flow chart illustrating a control procedure in the case where a mobile communication terminal enters a private mobile communication network in accordance with a preferred embodiment of the present invention.

Referring to FIGS. 2 and 5, if the MS 40 enters a private mobile communication network, then it receives a system parameter message being broadcast by a private mobile communication system at step 202. The MS 40 determines its presence in a private wireless network service area using the system parameter message at step 204. Subsequently, the MS 40 transmits a location registration message for a private wireless network service to the private mobile communication system at step 206.

A private mobile communication system determines if a corresponding subscriber is registered in a private wireless network using a location registration message transmitted from a mobile communication terminal, and transmits a FNM on the basis of the determined result. Then, it is determined at step S208 whether the MS 40 receives the FNM. If the MS 40 receives the FNM, then it informs a user of a fact that a current position is in a private wireless network service area at step 210. In this case, the MS 40 can inform the user of this fact using a variety of indication methods, for example, an icon display, a voice message, a character display, vibration, a ring tone, etc.

If the MS 40 is outside of the private mobile communication network area 70, then it receives a system parameter message from a public network mobile communication system. Because the system parameter message is generated from a public network mobile communication system, a specific bit for indicating a wireless private network service area is not set up. Therefore, if the MS 40 receives a system parameter message from the public network mobile communication system, then it can recognize its presence in a private network service area.

The present invention can be implemented as computer-executable instructions in computer-readable media. The computer-readable media includes all possible kinds of media in which computer-readable data is stored or included or can include any type of data that can be read by a computer or a processing unit. The computer-readable media include for example and not limited to storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The present invention can include the computer-readable medium having stored thereon a data structure including a plurality of fields containing data representing the techniques of the present invention.

Figure 6:
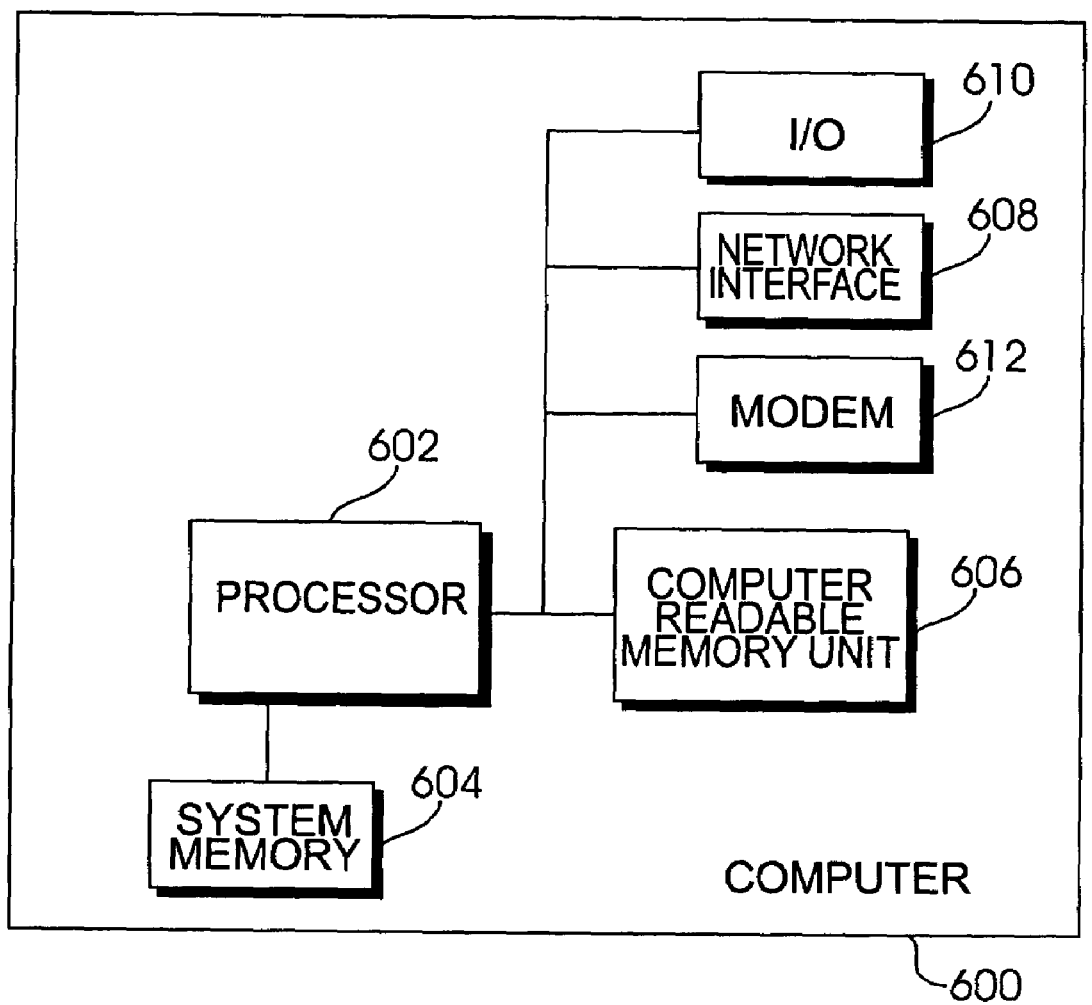
FIG. 6 shows an example of a computer including a computer-readable medium having computer-executable instructions for performing the techniques of the present invention.

An example of a computer, but not limited to this example of the computer, that can read computer readable media that includes computer-executable instructions of the present invention is shown in FIG. 6. The computer 600 includes a processor (central processing unit) 602 that controls the computer 600. The processor 602 uses the system memory 604 and a computer readable memory device 606 that includes certain computer readable recording media. A system bus connects the processor 602 to a network interface 608, modem 612 or other interface that accommodates a connection to another computer or network such as the Internet. The system bus may also include an input and output interface 610 that accommodates connection to a variety of other devices.

In conclusion, according to the present invention, a MS informs a user of its entrance into a specific area of a mobile communication system, such that a user can easily adapt a wireless private network service.

As apparent from the above description, the present invention enables a mobile communication terminal (MS) to accurately recognize a time at which the MS enters a private wireless network, thereby allowing a user of the MS to easily employ a specific service such as a private wireless Internet service, etc.

In accordance with another preferred embodiment of the present invention, the present invention provides a method for changing an incoming call indication mode to a manner mode such as a vibration or silent mode in a private mobile communication system in the case where the MS moves from a public mobile communication network to a private mobile communication network.

Although the present invention discloses a specific case where the MS moves from a public mobile communication network to a private network limited by a specific area or building, it can also be applicable to another case where the MS enters a specific area used for providing a service being different from a public network service in the public mobile communication network.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for providing a user with a private mobile communication service when a mobile communication terminal enters a private mobile communication network being interoperable with a public mobile communication network, comprising the steps of:

upon receiving a system parameter message being broadcast by the private mobile communication system, checking by the mobile communication terminal, a predetermined bit for indicating the private mobile communication service area contained in the system parameter message;

when the mobile communication terminal exists in the private mobile communication service area, transmitting a location registration message including a predetermined registration type to the private mobile communication system;

receiving a message including a private mobile communication service associated command by the mobile communication terminal from the private mobile communication system according to registration result information of the private mobile communication system; and performing, by the mobile communication terminal, a command contained in the received message.

2. The method as set forth in claim 1, wherein the command allows the mobile communication terminal to perform a manner mode conversion function.

3. A method for providing a user with a private mobile communication service when a mobile communication terminal enters a private mobile communication network being interoperable with a public mobile communication network, comprising the steps of:

upon receiving a system parameter message being broadcast by the private mobile communication system, checking a predetermined bit for indicating the private mobile communication service area contained in the system parameter message;

when the mobile communication terminal exists in the private mobile communication service area, transmitting a location registration message including a predetermined registration type to the private mobile communication system;

receiving a message including a private mobile communication service associated command from the private mobile communication system according to registration result information of the private mobile communication system; and performing a command contained in the received message, wherein the message including the private mobile communication service associated command is a feature notification message including a predetermined field used for indicating the private mobile communication service possible state.

4. A method for providing a user with the private mobile communication service when a mobile communication terminal enters a private mobile communication network being interoperable with a public mobile communication network, comprising the steps of:

upon receiving a system parameter message being broadcast by the private mobile communication system, checking a predetermined bit for indicating the private mobile communication service area contained in the system parameter message;

when the mobile communication terminal exists in the private mobile communication service area, transmitting a location registration message including a predetermined registration type to the private mobile communication system by the mobile communication terminal;

receiving a message including the private mobile communication service associated command from the private mobile communication system; and performing a command contained in the received message by the mobile communication terminal.

5. The method as set forth in claim 4, wherein the command enables the mobile communication terminal to perform a manner mode conversion function.

6. A method for providing a user with the private mobile communication service when a mobile communication terminal enters a private mobile communication network being interoperable with a public mobile communication network, comprising the steps of:

upon receiving a system parameter message being broadcast by the private mobile communication system, checking a predetermined bit for indicating the private mobile communication service area contained in the system parameter message;

when the mobile communication terminal exists in the private mobile communication service area, transmitting a location registration message including a predetermined registration type to the private mobile communication system;

receiving a message including the private mobile communication service associated command from the private mobile communication system; and performing a command contained in the received message, wherein the message including the private mobile communication service associated command is a feature notification message having a predetermined field used for indicating the private mobile communication service possible state.

7. The method as set forth in claim 6, wherein the predetermined field is a CHARi field of an IS-95 Information Records Element.

8. A method for providing a mobile communication terminal with a private mobile communication service in a private mobile communication system being interoperable with a public mobile communication network, comprising the steps of:

broadcasting a system parameter message with a predetermined bit indicating a private mobile communication service area to at least one mobile communication terminal residing in the private mobile communication service area;

receiving a registration message including a predetermined registration type requesting to register in the private mobile communication system from the mobile communication terminal;

performing a location registration of the mobile communication terminal after receiving the registration message; and transmitting a message including a private mobile communication service associated command to the mobile communication terminal.

9. The method as set forth in claim 8, wherein the command allows the mobile communication terminal to perform a manner mode conversion function.

10. A method for providing a mobile communication terminal with a private mobile communication service in a private mobile communication system being interoperable with a public mobile communication network, comprising the steps of:

broadcasting a system parameter message with a predetermined bit indicating a private mobile communication service area to at least one mobile communication terminal residing in the private mobile communication service area;

receiving a registration message including a predetermined registration type requesting to register in the private mobile communication system from the mobile communication terminal;

performing a location registration of the mobile communication terminal after receiving the registration message; and transmitting a message including a private mobile communication service associated command to the mobile communication terminal, wherein the message including a private mobile communication service associated command is a feature notification message having a predetermined field used for indicating the private mobile communication service possible state.

11. The method as set forth in claim 10, wherein the predetermined field is a CHARi field of an IS-95 Information Records Element.

12. A method for providing a user with a service of a specific area of a mobile communication network when the mobile communication terminal enters the specific area of a mobile communication system, comprising the steps of:

upon receiving a system parameter message being broadcast by the mobile communication system, checking a predetermined bit for indicating the specific area in the system parameter message by the mobile communication terminal;

when the mobile communication terminal exists in the service area of the specific area, transmitting a registration message including a predetermined registration type to the mobile communication system;

receiving a message including a specific area service associated command of a mobile communication network from the mobile communication system; and performing a command contained in the received message.

13. The method as set forth in claim 12, wherein the command enables the mobile communication terminal to perform a manner mode conversion function.

14. A computer-readable medium having computer-executable instructions for performing a method for providing a user with a private mobile communication service when a mobile communication terminal enters a private mobile communication network being interoperable with a public mobile communication network, comprising:

upon receiving a system parameter message being broadcast by the private mobile communication system, checking a predetermined bit for indicating the private mobile communication service area contained in the system parameter message by the mobile communication terminal;

when the mobile communication terminal exists in the private mobile communication service area, transmitting a location registration message including a predetermined registration type to the private mobile communication system;

receiving a message including a private mobile communication service associated command from the private mobile communication system according to registration result information of the private mobile communication system; and performing a command contained in the received message.

15. A computer-readable medium having computer-executable instructions for performing a method for providing a user with a private mobile communication service when a mobile communication terminal enters a private mobile communication network being interoperable with a public mobile communication network, comprising:

upon receiving a system parameter message being broadcast by the private mobile communication system, checking a predetermined bit for indicating the private mobile communication service area contained in the system parameter message;

when the mobile communication terminal exists in the private mobile communication service area, transmitting a location registration message including a predetermined registration type to the private mobile communication system;

receiving a message including a private mobile communication service associated command from the private mobile communication system according to registration result information of the private mobile communication system; and performing a command contained in the received message, wherein the message including a private mobile communication service associated command is a feature notification message including a predetermined field used for indicating the private mobile communication service possible state.

16. A method for providing a user with a private mobile communication service when a mobile communication terminal enters a private mobile communication network, comprising the steps of:

upon receiving a system parameter message being broadcasting by the private mobile communication system, checking, by the mobile communication terminal, a predetermined bit for indicating the private mobile communication service area contained in the system parameter message, and determining, by the mobile communication terminal, whether the mobile communication terminal exists in the private mobile communication service area;

when the mobile communication terminal exists in the private mobile communication service area, transmitting a location registration message including a predetermined registration type to the private mobile communication system;

receiving a message indicating a private mobile communication associated command from the private mobile communication system; and performing a command contained in the received message.

* * * * *